United States Patent [19]

Kolbert

[11] Patent Number: 4,924,520

[45] Date of Patent: May 8, 1990

[54] DEFINING AIRCRAFT PROTOCOL BY SHORTED PINS

[75] Inventor: Melvin Kolbert, Boca Raton, Fla.

[73] Assignee: Grumman Aerospace Corporation, Bethpage, N.Y.

[21] Appl. No.: 258,732

[22] Filed: Oct. 17, 1988

[51] Int. Cl.⁵ .............................................. H04L 11/00
[52] U.S. Cl. ......................................... 380/59; 380/9; 439/189; 336/83
[58] Field of Search ...................... 380/59, 9; 439/189; 336/83

[56] References Cited

U.S. PATENT DOCUMENTS

| | | | |
|---|---|---|---|
| 1,549,242 | 8/1925 | Wilson | 439/189 |
| 1,953,829 | 4/1934 | Morris | 380/55 |
| 3,382,475 | 5/1968 | Kramer | 439/189 |
| 3,457,550 | 7/1969 | Gibson et al. | 371/25 |
| 4,026,620 | 5/1977 | Lieberman | 439/189 |
| 4,038,590 | 7/1977 | Knowlton | 318/562 |
| 4,038,625 | 7/1977 | Tompkins et al. | 336/83 |
| 4,090,667 | 5/1978 | Crimmins | 439/189 |
| 4,680,781 | 7/1987 | Amundson et al. | 364/900 |
| 4,701,134 | 10/1987 | Jones | 439/189 |

FOREIGN PATENT DOCUMENTS 186243 12/1980 Japan .
147320 9/1981 Japan .

Primary Examiner—Thomas H. Tarcza
Assistant Examiner—David Cain
Attorney, Agent, or Firm—Pollock, VandeSande & Priddy

[57] ABSTRACT

Data protocol and format parameters are encoded by a modified connector located between a data source and a receiving memory. The modification includes the opening or shorting of pin connectors in a unique pattern corresponding to particular protocol and format parameters of a data utilization device.

4 Claims, 3 Drawing Sheets

DEFINING AIRCRAFT PROTOCOL BY SHORTED PINS

FIELD OF THE INVENTION

The present invention relates to data connectors, and more particularly to such connectors wherein pins may be shorted or opened to define data protocol and format.

BACKGROUND OF THE INVENTION

In the daily preparation of military aircraft, it is often necessary to store regularly updated security codes, known as crypto-variables or keys into weapon control and other communication systems such as friend or foe identification systems (IFF). This task is currently performed by a portable code storage box which is connected to an aircraft code memory device by means of conventional pin connectors. In the naval fleet this transfer of security codes to an aircraft is done during pre-dawn hours in all types of weather and sea conditions. On an aircraft carrier, this is manually performed by a custodian to aircraft that rests on the flight and hanger decks.

Although the procedure is generally satisfactory, it is a time-consuming one requiring proper connector hook-up between aircraft and the custodian's portable security code box. Due to the harsh environment, connectors often deteriorate and the reliability of the connectors is limited. Typically, such connectors are called upon to transfer digital security codes to an internal code memory of the aircraft. When the connectors between the portable code box and the aircraft evidence physical or electrical deterioration, errors in code transfer are possible.

In my co-pending application Ser. No. 724,605, a coupling device was disclosed which preferably, magnetically transfers data and circuit power to an aircraft security code storage circuit without the inclusion of mechanical pin connectors. In the environment of an aircraft, the conventional custodian's security code portable transfer box is equipped with a sending unit which is magnetically attached to the exterior of an aircraft skin. At an aligned position along the interior surface of the skin is a receiving pick-up unit which magnetically picks up the digital code and low voltage power being transferred by the sending unit. The sending unit is easily removed after signal and power transfer have taken place by simply detaching it from the aircraft. As will be appreciated, such a simple and elegant technique avoids the problems of pin-type connectors which have been employed heretofore.

However, a data generator is required to provide data to an aircraft in various formats and different protocols. Accordingly, it is necessary, each time the generator communicates with a particular aircraft, to define the format, protocol and specific utilization devices on board the aircraft in order for the data to be accepted. In order to automatically accommodate various military aircraft already existing, a simple and reliable means must be found for defining these data parameters with minimum modification to existing equipment and in a manner that will be extremely reliable, automatic and maintenance free.

BRIEF DESCRIPTION OF THE INVENTION

The present invention is directed to achieving the last-mentioned objectives for successful data transmission between an external data generator and internal data utilization devices within an aircraft. In essence, a data connector within each aircraft is modified with open-circuited or shorted pins which will provide addresses defining the particular utilization equipment on board that aircraft as well as what protocol and format are required for successful data transmission from the generator to an aircraft utilization device. A simple modification of connector pins therefore satisfies the objectives of the invention as previously discussed.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
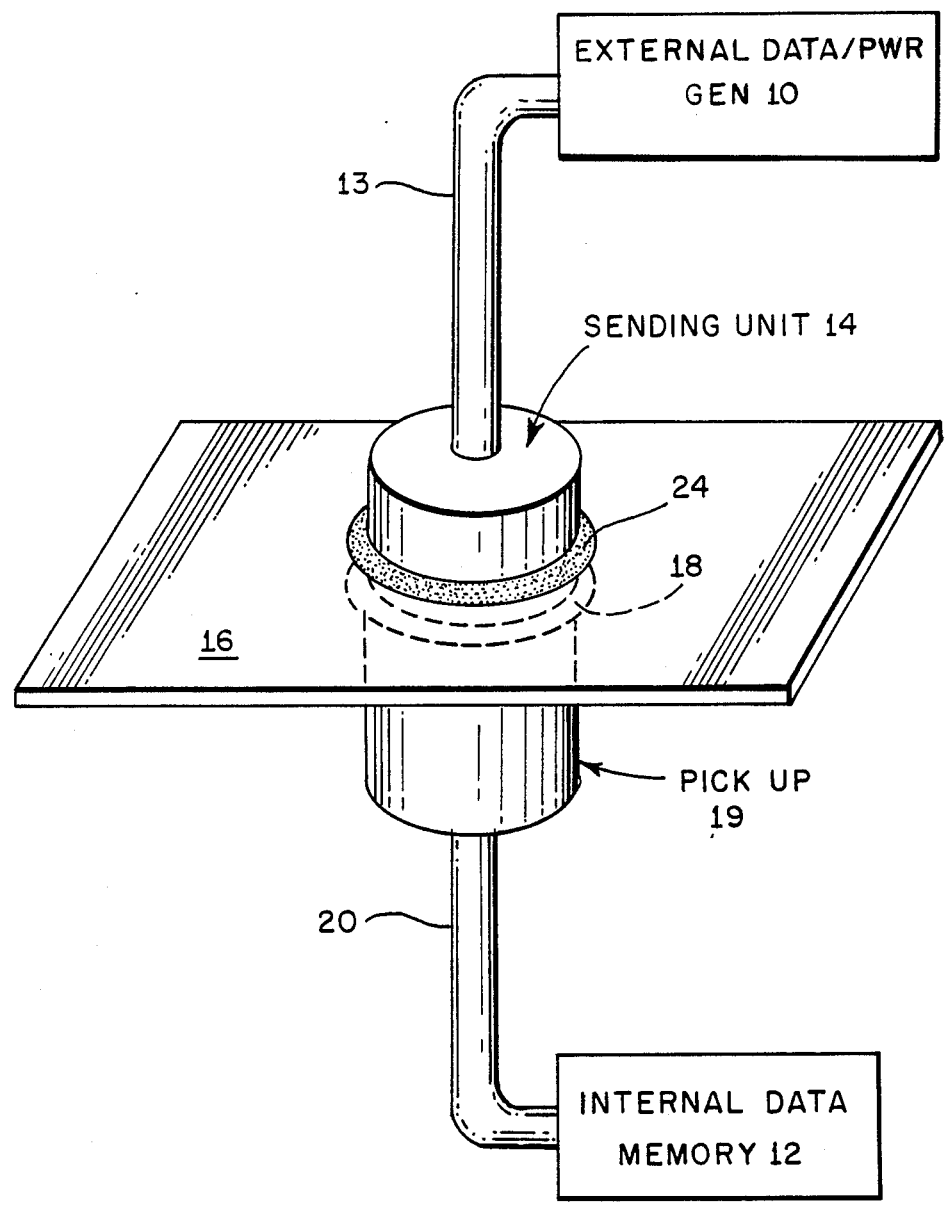
FIG. 1 is a diagrammatic illustration of the coupler system installed on an aircraft skin, as disclosed in my co-pending application.
Figure 4:
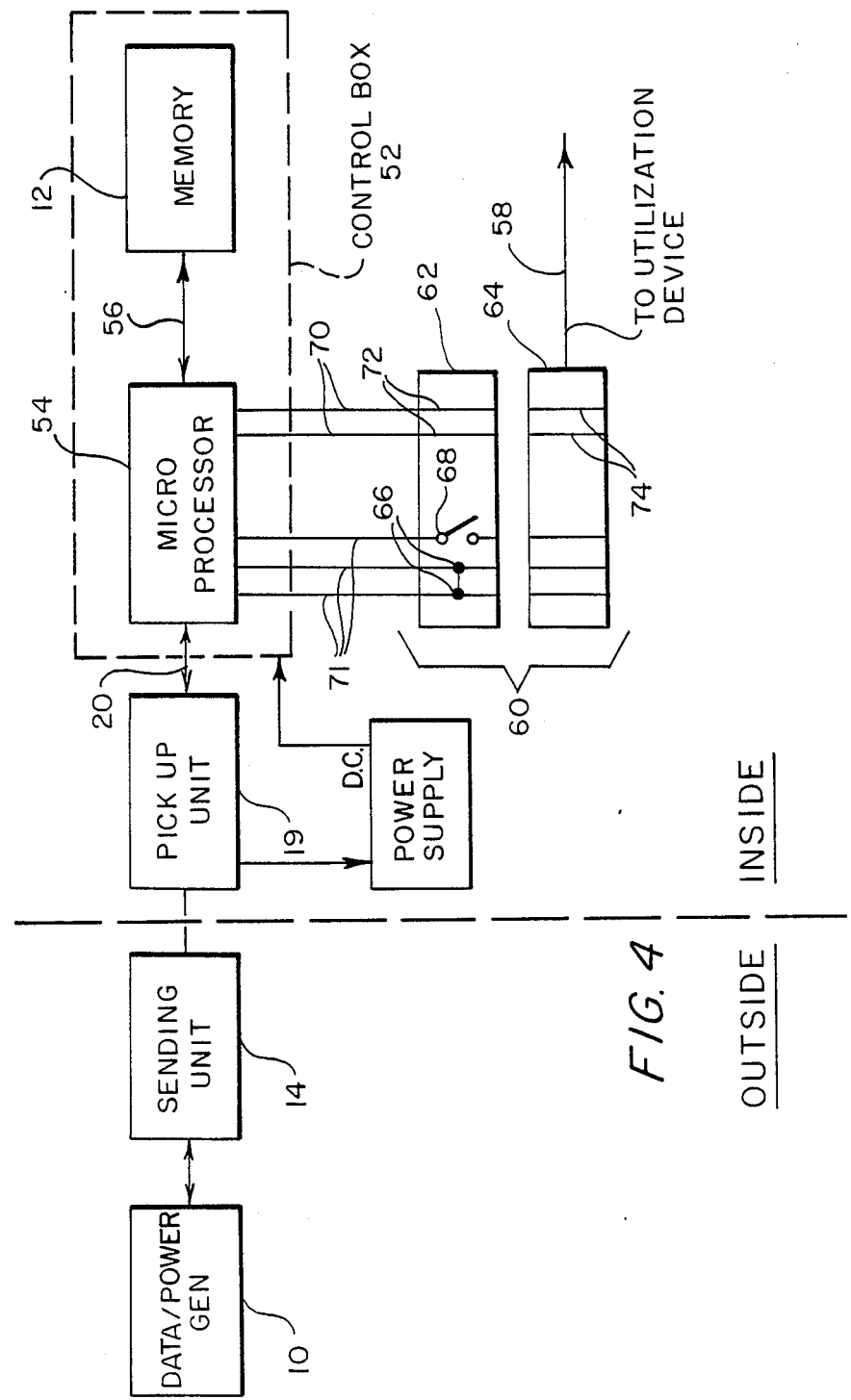
FIG. 4 is a diagrammatic illustration of the modified data connector forming the present invention.

Prior to a discussion of the particular invention herein, as diagrammatically illustrated in FIG. 4, it is instructive to review the system to which the present invention pertains. Accordingly, FIG. 1 is a diagrammatic view of the coupler system shown installed on an aircraft skin and which forms the invention of my co-pending application Ser. No. 224,605. The portable code box discussed in the Background of the Invention is indicated as an external data/power generator 10 in FIG. 1. Such an external storing generator has long been used in the prior art. In addition to being able to read out stored data, the generator 10 is supplied with a switch that initially powers an internal aircraft power supply when the aircraft's own power is off, thereby enabling a memory to start its data storage operation and send confirmation control signals back to the generator 10.

Figure 2:
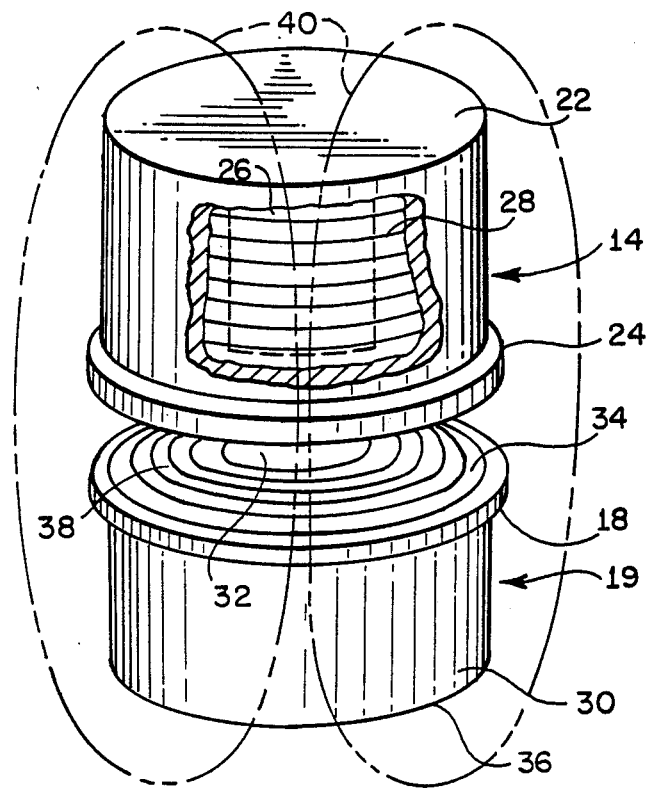
FIG. 2 is a cut-away diagrammatic view of a magnetic induction sending and pick-up pair which forms the heart of the invention of my co-pending application.

The coupling of power and data from the generator 10 includes a cable 13 connected at a first end to generator 10 and at an opposite end to a sending unit 14. In a preferred embodiment such a unit is an inductive primary unit as shown in FIG. 2 to be discussed hereinafter.

The sending unit 14 is equipped with a circular magnetic ring 24, which may be of the gasket type used in home refrigerators. A mating magnetic ring 18 is appropriately cemented to the internal surface of an aircraft skin 16. The sending unit 14 is detachable from the aircraft skin by simply exerting sufficient tension. Of course, other types of temporary attachment may be employed such as suction, velcro, etc.

A complementary inductive pick-up unit 19 may be permanently cemented to the interior surface of the aircraft skin 16, as just discussed in connection with the sending unit 14. Signals sent from generator 10 through the sending unit 14 are inductively picked-up by the pick-up unit 19 and transferred to an internal data memory 12 by means of a cable 20.

In operation of the device illustrated in FIG. 1, power may be supplied from the external data/power generator 10 to the internal data power supply in order to power the memory circuits 12 if the aircraft power supply is turned off. The data memory circuits 12 are of the non-volatile type that already exist aboard military aircraft. After the memory circuits have been sufficiently energized, the generator 10 may be switched to a data transmission mode so that the sending unit and pick-up units 14 and 19, respectively, may couple the data to the data memory 12.

The particular structures of the inductive coupling units 14 and 19 are illustrated in greater detail in FIG. 2. However, it is to be emphasized that other types of sending and pick-up units, other than the particular inductive units illustrated in FIG. 2, may be employed. For example, other types of magnetic, capacitive, sonic or vibratory transducers are technically feasible.

The particular magnetic inductance units shown in FIG. 2 include a sending unit 14 having a ferromagnetic housing 22 with a ring magnet, preferably a rubber gasket type ring magnet 24 cemented around the bottom periphery thereof. The magnet is for detachable connection to the aluminum aircraft skin by means of the magnets internally cemented thereto, as previously mentioned. A cylindrical ferromagnetic coil form is axially disposed within the housing 22 and serves as a core for winding 28 also located within the housing. The winding 28 serves as a primary winding and cooperates with a secondary winding, located within the pick-up unit 19, as will be discussed hereinafter. An electromagnetic field is created between the primary winding 28, core 26 and the housing 22.

The pick-up unit 19 includes a similar structure, namely, a central ferromagnetic core 32 with a secondary winding 38 secured thereto and a ferromagnetic housing 30 which may be opened on the illustrated top end 34 to allow the sending structure to be cemented, at this end, to the interior surface of an aircraft skin. Alternately, this end may be enclosed and detachably mounted to the interior surface of an aircraft skin by means of ring magnets, as discussed in connection with FIG. 1. The opposite end 36 of the pick-up unit 19 is closed. An electromagnetic field is created between the cores 26 and 32 via housings 22 and 30. When the sending and pick-up units are positioned on opposite sides of an aircraft skin, the two units are inductively coupled and magnetic flux lines link the two, as indicated by reference numeral 40. Though the primary and secondary are defined above, they are reversible when communicating out from the aircraft to the data/power generator.

Figure 3:
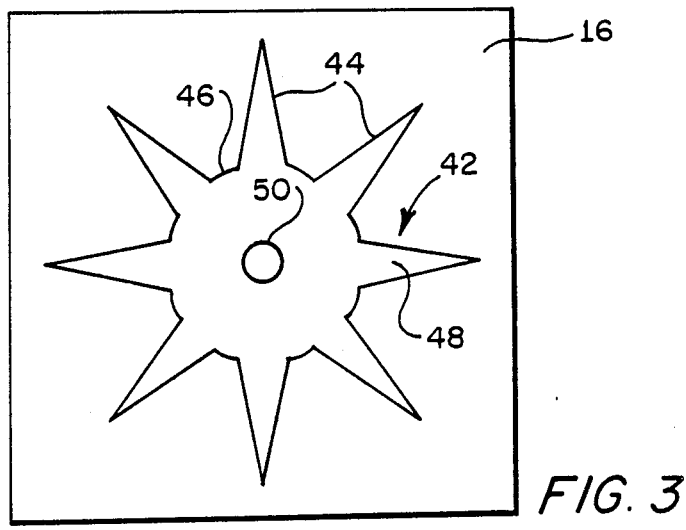
FIG. 3 is a diagrammatic elevational view of a section of an aircraft skin to which a sending unit, such as shown in FIG. 2, is attached.

In order to minimize power dissipation of the coupled signal and power, it would be preferable to have the area of the aircraft skin between the sending and pick-up units fabricated from a non-conducting material. This is a preferable design consideration when high frequencies are employed or otherwise, unwanted eddy currents may develop. In order to maximize the structural connection of a non-conductive area to a conductive aircraft skin, a slotted configuration as shown in FIG. 3 may be employed. In this figure, an area of the aircraft skin 16 has a star-shaped slot 42 cut therein. The void created is filled with a non-conductive material, for example, Fiberglass, so as to completely fill the slot as indicated by reference numeral 48. The slot itself is characterized by pointed projections 44 interconnected around a circular boundary 46. The utilization of the pointed projections increases the electrical and electromagnetic resistance of the aircraft skin in the vicinity of installation for sending and pick-up units which results in a decrease of power dissipation between the sending and pick-up units. In addition, the projections serve to mechanically interlock the non-conductive material 48 to the aircraft skin 16, this being an important consideration in the harsh environment encountered along the outer skin of a military high-speed aircraft.

The center of the filled-in slot may have a central spot 50 painted thereon so as to guide the center placement of the sending unit 14 when data and power are to be inductively coupled. Final accurate centering is provided by the pull of the magnets 24, 18.

Although a simplified inductive coupling is illustrated in connection with the sending and pick-up units, it is also possible to use multiple coils to separate the coupled signal and power so that two distinctive coupling paths are created.

FIG. 4 illustrates the particular improvement constituting the present invention. As previously explained in connection with FIG. 1, basic bidirectional data communication occurs between the data generator 10, sending unit 14, spaced pick-up unit 19 and memory 12. Memory 12 serves to temporarily buffer data that has been transmitted by data generator 10 until a utilization device is ready to accept the data generally during aircraft power up.

Control box 52 is indicated in FIG. 4 and is connection with FIG. 1, the buffer memory receiving and transferring data therefrom under the control of a microprocessor 54, also part of the aircraft enclosed control box 52. Bi-directional data transfer between the microprocessor 54 and buffer memory 12 occurs along line 56. When the data in buffer memory 12 is to be accepted by a particular utilization device along line 58, the microprocessor 54 reads out the data from the memory 12 and transfers it through connector assembly 60 and connector output line 58.

However, as previously explained, the utilization devices on different aircraft serviced by the same data generator 10 usually require different data formats and protocol. In order to ensure that these parameters are correct for the particular utilization device on board an aircraft, it is necessary to identify the protocol and format requirements for the data generator 10, prior to data transmission. The significance of the present invention is the utilization of the connector assembly 60 as a means for achieving such identification during a data "hand-shaking" operation between the data generator 10 and the microprocessor 54 just prior to actual data transfer.

The present invention includes the mechanical modification of connector 62 and more particularly the shorting of pins (66) or the open circuiting of pins (68) in a manner that establishes the bits of an identification code for the particular correspondingly connected utilization device. Data is transferred to the utilization device after "hand shaking," along non-shorted or opened pins 72, the latter connected to the microprocessor along lines 70.

By shorting or opening pins during a "hand-shaking" operation, the microprocessor 54 is able to establish an identification address from reading the open and shorted pin voltage levels along corresponding interconnecting lines 71. After the microprocessor communicates this identification address to the data generator 10, via pick-up unit 19 and sending unit 14, the data generator 10 is able to provide the proper protocol and data format to achieve meaningful data transmission to a particular utilization device on board the aircraft. It should be noted that the sending unit 14 and pick-up unit 19, being preferably inductively coupled, are capable of transmitting the identification address from the pick-up unit 19 to the sending unit 14, whereas actual data transmission occurs from the sending unit 14 to pick-up unit 19. The data transmission occurs along lines 70, pins 72 of connector 62, and pins 74 of connector 64. As is diagrammatically illustrated in FIG. 4, this data signal path is not interrupted with open or short-circuited pins. Since the data transmission along lines 70 may be along more than one port, the identification or the code identification address may also include information concerning which ports (and therefore lines) are to carry the data.

The data from data generator 10 is temporarily stored in buffer memory 12 and then read out to prospective utilization devices through connector assembly 60 and line 58. After the data transfer to the utilization device has been verified, memory 12 may be erased.

After successful transfer of data, the data generator 10 may then be moved to the next aircraft for a repetition of the discussed sequence. It is emphasized that the data generator 10, control box 52 and intended utilization devices are currently being used to effect data transfer. The sending unit 14 and pick-up unit 19 are those disclosed in my co-pending application. However, the sending and pick-up units 14 and 19 may take the place of the more conventional plug-in connectors currently being utilized.

It should be understood that the invention is not limited to the exact details of construction shown and described herein for obvious modifications will occur to persons skilled in the art.

I claim:

1. A method for initializing security data communication between a portable data source and bidirectional data utilization devices on board an aircraft, the method comprising the steps:

mechanically modifying normally connected pins of an electrical connector between a microprocessor on board the aircraft and a utilization device which establishes a coded bit pattern corresponding to data format and protocol requirements of the device;

communicating the coded bit pattern from the microprocessor to the source;

subsequently transmitting data from the source to a buffer memory in the required format and protocol; and reading out the data from the memory to the utilization device through normally retained connected pins of the electrical connector.

2. The method set forth in claim 1 wherein the mechanical modification comprises the step of short-circuiting preselected pins of the connector.

3. The method set forth in claim 1 wherein the mechanical modification comprises the step of open-circuiting preselected pins of the connector.

4. The method set forth in claim 1 together with the step of inductively coupling all signals between the source and the memory through an aircraft skin.

* * * * *

UNITED STATES PATENT AND TRADEMARK OFFICE
CERTIFICATE OF CORRECTION

PATENT NO. : 4,924,520

DATED : May 8, 1990

INVENTOR(S) : Melvin Kolbert

It is certified that error appears in the above-identified patent and that said Letters Patent is hereby corrected as shown below:

Column 4, line 31, after "is" (second occurrence) insert --physically located within an aircraft to receive data. The control box includes the buffer memory 12 discussed in--.

Signed and Sealed this

Ninth Day of July, 1991

Attest:

*Attesting Officer*

HARRY F. MANBECK, JR.

*Commissioner of Patents and Trademarks*